(12) United States Patent
Thybo et al.

(10) Patent No.: US 8,100,167 B2
(45) Date of Patent: Jan. 24, 2012

(54) METHOD AND A DEVICE FOR DETECTING AN ABNORMALITY OF A HEAT EXCHANGER, AND THE USE OF SUCH A DEVICE

(75) Inventors: Claus Thybo, Soenderborg (DK); Christian Bendtsen, Soenderborg (DK)

(73) Assignee: Danfoss A/S, Nordborg (DK)

( * ) Notice: Subject to any disclaimer, the term of this patent is extended or adjusted under 35 U.S.C. 154(b) by 239 days.

(21) Appl. No.: 12/355,426

(22) Filed: Jan. 16, 2009

(65) Prior Publication Data
US 2009/0126899 A1    May 21, 2009

Related U.S. Application Data

(62) Division of application No. 10/531,056, filed as application No. PCT/DK03/00701 on Oct. 14, 2003.

(30) Foreign Application Priority Data

Oct. 15, 2002    (DK) ................................ 2002 01582

(51) Int. Cl.
*G01M 99/00*    (2011.01)
*F28F 27/00*    (2006.01)

(52) U.S. Cl. ............. 165/11.1; 165/95; 374/29; 374/43; 374/112; 374/134; 700/276; 702/136; 62/125; 62/129; 62/130

(58) Field of Classification Search ................. 165/11.1, 165/95; 374/29, 43, 112, 134; 700/276; 702/136; 62/125, 129, 130
See application file for complete search history.

(56) References Cited

U.S. PATENT DOCUMENTS

| | | | |
|---|---|---|---|
| 2,295,992 | A | 9/1942 | Gonzalez et al. |
| 3,171,462 | A | 3/1965 | Reinhart, Jr. |
| 3,707,851 | A | 1/1973 | McAshan, Jr. |
| 3,918,300 | A | 11/1975 | Weisstuch et al. |
| 4,136,528 | A | 1/1979 | Vogel et al. |

(Continued)

FOREIGN PATENT DOCUMENTS

CA    2344908 A1    1/2002
(Continued)

OTHER PUBLICATIONS

International Search Report from corresponding International Appln. No. PCT/DK03/00251 dated Sep. 4, 2003 (6 pages).

(Continued)

*Primary Examiner* — John Ford
(74) *Attorney, Agent, or Firm* — McCormick, Paulding & Huber LLP

(57) ABSTRACT

A method and a device for detecting an abnormality of a heat exchanger exchanging heat between a first fluid flow flowing in a conduit and a second fluid flow flowing along a flow path, said conduit and said flow path each having an inlet and an outlet, whereby the method comprises the steps of establishing at least one parameter representative of the temperature conditions of the heat exchanger, establishing a second fluid inlet temperature, establishing a parameter indicative of expected heat exchange between the heat exchanger and the second fluid, processing the heat exchanger temperature, the second fluid temperature and the parameter indicative of expected heat exchange for establishing an estimated second fluid outlet temperature, and employing the estimated second fluid outlet temperature for evaluating the heat exchange between the first and second fluids by comparing the estimated second fluid outlet temperature, or a parameter derived therefrom, with a reference value.

7 Claims, 4 Drawing Sheets

U.S. PATENT DOCUMENTS

| | | | |
|---|---|---|---|
| 4,193,781 A | 3/1980 | Vogel et al. | |
| 4,325,223 A | 4/1982 | Cantley | |
| 4,390,058 A | 6/1983 | Otake et al. | |
| 4,479,727 A | 10/1984 | Domingorena et al. | |
| 4,500,035 A | 2/1985 | Kuroda et al. | |
| 4,510,576 A | 4/1985 | MacArthur et al. | |
| 4,574,870 A | 3/1986 | Weitman | |
| 4,611,470 A | 9/1986 | Enström | |
| 4,614,087 A | 9/1986 | Nadamoto et al. | |
| 4,621,502 A | 11/1986 | Ibrahim et al. | |
| 4,729,667 A | 3/1988 | Blangetti et al. | |
| 4,766,553 A | 8/1988 | Kaya et al. | |
| 4,768,346 A | 9/1988 | Mathur | |
| 4,885,914 A | 12/1989 | Pearman | |
| 5,079,930 A | 1/1992 | Beaverson et al. | |
| 5,289,692 A | 3/1994 | Campbell et al. | |
| 5,341,649 A | 8/1994 | Nevitt et al. | |
| 5,363,905 A | 11/1994 | Rhiel et al. | |
| 5,457,965 A | 10/1995 | Blair et al. | |
| 5,596,507 A | 1/1997 | Jones et al. | |
| 5,615,733 A | 4/1997 | Yang | |
| 5,623,426 A | 4/1997 | Ozawa et al. | |
| 5,689,963 A | 11/1997 | Bahel et al. | |
| 6,089,033 A | 7/2000 | Dube | |
| 6,128,910 A | 10/2000 | Faircloth | |
| 6,223,544 B1 | 5/2001 | Seem | |
| 6,225,907 B1 | 5/2001 | Derryberry et al. | |
| 6,234,398 B1 * | 5/2001 | Pawlak et al. | 236/91 C |
| 6,272,868 B1 | 8/2001 | Grabon et al. | |
| 6,330,802 B1 | 12/2001 | Cummings et al. | |
| 6,460,358 B1 | 10/2002 | Hebert | |
| 6,543,238 B2 | 4/2003 | Yamanaka et al. | |
| 6,590,362 B2 | 7/2003 | Parlos et al. | |
| 2002/0055358 A1 | 5/2002 | Hebert | |
| 2002/0139128 A1 | 10/2002 | Suzuki et al. | |
| 2003/0019221 A1 | 1/2003 | Rossi et al. | |
| 2003/0055603 A1 | 3/2003 | Rossi et al. | |
| 2003/0156999 A1 | 8/2003 | Knudsen et al. | |
| 2004/0144106 A1 | 7/2004 | Douglas et al. | |
| 2005/0166608 A1 | 8/2005 | Thybo | |
| 2005/0166609 A1 | 8/2005 | Thybo et al. | |
| 2005/0172647 A1 | 8/2005 | Thybo et al. | |
| 2006/0032606 A1 | 2/2006 | Thybo et al. | |

FOREIGN PATENT DOCUMENTS

| | | |
|---|---|---|
| DE | 2451361 | 5/1976 |
| DE | 10138821 A1 * | 3/2003 |
| EP | 0155826 A2 | 9/1985 |
| EP | 0453302 A1 | 10/1991 |
| EP | 0518035 A2 | 12/1992 |
| EP | 0559043 A1 | 9/1993 |
| EP | 0470676 A2 | 2/1995 |
| GB | 2062919 A | 5/1981 |
| JP | 63071625 A | 4/1988 |
| JP | 01174870 A | 7/1989 |
| JP | 5264136 A | 10/1993 |
| JP | 07234043 A | 9/1995 |
| JP | 2001255046 A | 9/2001 |
| WO | 87/05097 A1 | 8/1987 |
| WO | 02/090832 A1 | 11/2002 |

OTHER PUBLICATIONS

International Search Report from corresponding International Appln. No. PCT/DK03/00252 dated Sep. 4, 2003 (6 pages).

International Search Report from corresponding International Appln. No. PCT/DK03/00468 dated Oct. 3, 2003 (3 pages).

International Search Report from corresponding International Appln. No. PCT/DK03/00701 dated Feb. 6, 2004 (3 pages).

Richard W. Hamming, Calculus and the Computer Revolution, 1968, The Mathematical Association of America, Inc. (pp. 43-57).

Wilbert F. Stoecker, Industrial Refrigeration Handbook, 1998, McGraw-Hill Companies, Inc. (pp. 193-195).

Yunus A. Cengel, Michael A. Boles, Thermodynamics, 1998, McGraw-Hill, 3rd Edition (pp. 214-217).

Yunus A. Cengel, Michael A. Boles, Thermodynamics, 2001, McGraw-Hill, 4th Edition (pp. 193-195).

European Search Report Issued for related application No. 03 757 722.8 dated Sep. 22, 2005, 3 pages.

* cited by examiner

METHOD AND A DEVICE FOR DETECTING AN ABNORMALITY OF A HEAT EXCHANGER, AND THE USE OF SUCH A DEVICE

CROSS REFERENCE TO RELATED APPLICATIONS

This application is a Divisional Application of Non-Provisional application Ser. No. 10/531,056 entitled "A METHOD AND A DEVICE FOR DETECTING AN ABNORMALITY OF A HEAT EXCHANGER, AND THE USE OF SUCH A DEVICE", to Claus Thybo, et al., filed on Apr. 12, 2005, claiming priority to International Patent Application No. PCT/DK2003/000701 filed on Oct. 14, 2003 and Danish Patent Application No. PA 2002 01582 filed on Oct. 15, 2002.

FIELD OF THE INVENTION

The present invention relates to a method and a device for detecting an abnormality of a heat exchanger exchanging heat between a first fluid flow flowing in a conduit and a second fluid flow flowing along a flow path, said conduit and said flow path each having an inlet and an outlet, and the use of such a device.

BACKGROUND OF THE INVENTION

Heat exchangers are an important part of many plants and systems, especially refrigeration or heat pump systems. These heat exchangers and their efficiency are of crucial importance in such systems, and it is therefore important to monitor functioning of the heat exchangers to be able to detect abnormality of the heat exchanger, so measures can be taken to remedy any defects.

By abnormality of the heat exchanger is meant that the heat exchanger does not exchange as much energy as expected, i.e. the fluids do not experience the cooling or heating they should. This may be due to fouling of heat exchanger, in that a layer of scale, dirt or grease is deposited on the heat exchanging surface or surfaces leading to reduced heat exchange, as this layer will usually act as an insulating layer. Another possibility is that there is insufficient fluid flow because of dirt or the like blocking or restricting flow through the heat exchanger. Both situations lead to higher power consumption, because the system must work at a higher load than a system working with heat exchangers within the normal range. Further in the event of adverse working conditions with high heat exchange demand and a relatively small temperature difference between the fluids, it may be impossible to meet the demand, which in some systems may have devastating effect.

Often the abnormality will not be detected before an adverse working condition is experienced, in that the demand cannot be met, e.g. leading to an increase of the temperature of a system, which should be kept at a specific temperature. An example of such a system is a refrigerated display cabinet in a shop, where strict legislation in most countries prescribes that when food is not kept below a maximum temperature, it must be discarded, which of course is expensive and devastating for the business. Likewise large computer systems are often kept in air-conditioned rooms, as an excessive temperature may increase the risk of a computer crash, which may entail a high risk of data loss and lost man-hours.

Common provisions for detecting abnormality of a heat exchanger include basic visual inspection at regular intervals to check for dirt at the inlet of the heat exchanger. Often the heat exchangers are placed so inspection is difficult, and hence such inspection is labour consuming. Further an abnormality may arise at different intervals and quite quickly, e.g. in the event of material blocking the inlet to the heat exchanger. This means that to provide a reasonable degree of security against heat exchanger abnormality, it is necessary to inspect the heat exchangers often. Further a visual inspection of the outside of the heat exchanger may not be effective in assessing whether the internal heat exchanging surfaces are subject to fouling etc. causing a reduced heat exchange.

Another known way of detecting abnormality of a heat exchanger is by direct flow measurement. A direct flow measurement requires delicate and expensive equipment, such as hot wire anemometers or the like, and a plurality of flow measurement devices should be used to gain useful information on the overall flow field. It has also been proposed to assess the flow based on pressure sensors, but such pressure sensors are also expensive, and to gain useful information on the overall flow field a plurality of pressure sensors should be used. A further disadvantage of these methods are that they can only be used to establish if there is restricted flow in the heat exchanger, not the situation where the flow is normal, but heat exchange is reduced, e.g. because of fouling of the heat exchanger surface.

SUMMARY OF THE INVENTION

It is an object of the present invention to provide a method to enable early detection of an abnormality of a heat exchanger.

This object is met by a method comprising the steps of:
establishing at least one parameter representative of the temperature conditions of the heat exchanger,
establishing a second fluid inlet temperature,
establishing a parameter indicative of expected heat exchange between the heat exchanger and the second fluid,
processing the heat exchanger temperature, the second fluid temperature and the parameter indicative of expected heat exchange for establishing an estimated second fluid outlet temperature,
employing the estimated second fluid outlet temperature for evaluating the heat exchange between the first and second fluids by comparing the estimated second fluid outlet temperature, or a parameter derived therefrom, with a reference value. By this method is provided a convenient way of assessing the functioning of the heat exchanger primarily based on parameters of the first fluid, which means that a minimum of sensors are needed for providing information regarding the second fluid, and an automatic detection of heat exchanger abnormality is made possible. Further this method makes it possible to detect restricted flow as well as fouling of the heat exchanger.

According to an embodiment, the reference value is a predetermined second fluid outlet temperature.

An even more reliable, alternative method can be obtained when the method comprises the steps of using the estimated second fluid outlet temperature for establishing a second heat rate of the second fluid for evaluating the energy balance of the second heat rate of the second fluid compared to a first heat rate of the first fluid, as an evaluation based on the assumption of energy balance will take the influence of further parameters into account.

According to an embodiment, the method comprises establishing the second rate of heat flow of the second fluid by establishing an estimate of a second fluid mass flow and a specific enthalpy change of the second fluid across the heat exchanger based on the estimated second fluid outlet temperature and the second fluid inlet temperature.

According to an embodiment, the method comprises establishing the first rate of heat flow by establishing a first fluid mass flow and a specific enthalpy change of the first fluid across the heat exchanger based on parameters representative for first fluid inlet and outlet temperatures, and the condensation pressure.

A direct evaluation of the heat exchange is possible, but may however be subject to some disadvantages, e.g. because of fluctuations or variations of the parameters in the refrigeration or heat pump system, and according to an embodiment, the method comprises establishing a residual as difference between the first heat rate and the second heat rate.

It may also be possible to evaluate the heat exchange by direct evaluation of the estimated outlet second fluid outlet temperature, but this may however be subject to some disadvantages, e.g. because of fluctuations or variations of the parameters in the refrigeration or heat pump system, and according to an alternative embodiment, the method comprises establishing a residual as difference between the estimated and predetermined second fluid outlet temperature.

To further reduce the sensibility to fluctuations or variations of parameters in the system and be able to register a trend of heat exchanging, the method comprises providing an abnormality indicator by means of the residual, the abnormality indicator being provided according to the formula:

$$S_{\mu,i} = \begin{cases} S_{\mu,i-1} + s_i, & \text{when } S_{\mu,i-1} + s_{\mu,i} > 0 \\ 0, & \text{when } S_{\mu,i-1} + s_{\mu,i} \leq 0 \end{cases}$$

where $s_{\mu,i}$ is calculated according to the following equation:

$$s_{\mu,i} = c_1\left(r_i - \frac{\mu_0 + \mu}{2}\right)$$

where $c_1$ is a proportionality constant, $\mu_0$ a first sensibility value, and $\mu$ a second sensibility value.

Another aspect of the invention regards a heat exchanger abnormality detection device for a heat exchanger exchanging heat between a first fluid in a conduit and a second fluid in a flow path, where the device comprises a first estimator estimating a heat exchanger temperature, a first intermediate memory means storing the heat exchanger temperature, a temperature sensor measuring the second fluid inlet temperature, a second intermediate memory means storing the second fluid inlet temperature, a second estimator establishing a parameter indicative of expected heat exchange between the heat exchanger and the second fluid, a third intermediate memory means storing the parameter indicative of expected heat exchange, a processor establishing an estimated second fluid outlet temperature based on said heat exchanger temperature, said second fluid inlet temperature, from the first and second intermediate memory means, respectively, and, from the third intermediate memory means, the parameter indicative of expected heat exchange, and a comparator comparing the estimated second fluid outlet temperature, or a parameter established on basis thereof, with a reference value.

An embodiment of the device further comprises memory means for storing at least one parameter from the processor, whereby a device is obtained which may operate on the basis of previously stored data.

Although applicable to heat exchangers in general, it is found that the device is particularly suited for an embodiment, where the heat exchanger is part of a vapour-compression refrigeration or heat pump system comprising a compressor, a condenser, an expansion device, and an evaporator interconnected by conduits providing a flow circuit for the first fluid, said first fluid being a refrigerant.

According to an embodiment, the heat exchanger is the condenser, which is particularly difficult to monitor, as the refrigerant in the condenser is present in three different phases, namely as superheated gas, a mixture of gas and liquid and sub cooled liquid.

According to an embodiment, the second fluid is air, which is the most common type of second fluid for refrigeration or heat pump systems as outlined above, and for which direct measurement of fluid parameters involves some special problems. Further the air used normally is the ambient air, which may contain different kinds of pollution, which may deposit on the heat exchanger.

Specifically the evaporator may be part of a refrigerated display cabinet positioned within a building and the condenser is positioned outside the building, which is a special example, where the device according to the invention may be of particular value.

A third aspect regards use of a detection device as outlined above, where the detection device is used for detecting fouling of the heat exchanger and/or detecting insufficient flow of the second fluid.

BRIEF DESCRIPTION OF THE DRAWINGS

In the following, the invention will be described in detail by way of example with reference to the drawing, where.

DETAILED DESCRIPTION OF THE PREFERRED EMBODIMENTS

In the following reference will be made to a heat exchanger in a simple refrigeration system, although the principle is equally applicable to a heat exchanger in other heat exchanging systems, and as understood by the skilled person, the invention is in no way restricted to a refrigeration system.

Figure 1:
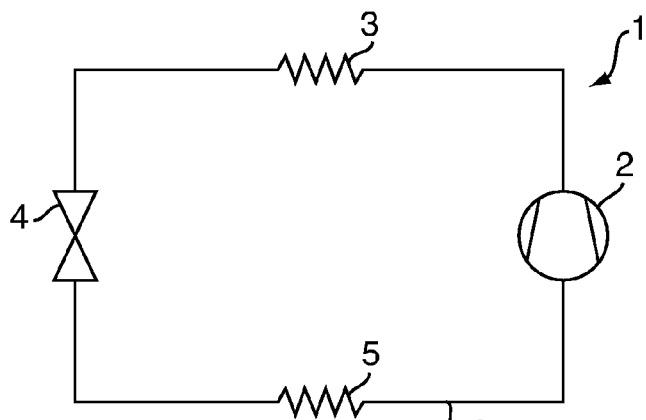
FIG. 1 is a sketch of a refrigeration system.

In FIG. 1 is shown a simple refrigeration system 1 comprising a compressor 2, a condenser 3, an expansion device 4 and an evaporator 5, which are connected by a conduit 6 in which a refrigerant is circulating. In vapour-compression refrigeration or heat pump systems the refrigerant circulates in the system and undergoes phase change and pressure change. In the system 1 a refrigerant gas is compressed in the compressor 2 to achieve a high pressure refrigerant gas, the refrigerant gas is fed to the condenser 3 (heat exchanger), where the refrigerant gas is cooled and condensates, so the refrigerant is in liquid state at the exit from the condenser 3, expanding the refrigerant in the expansion device 4 to a low pressure and evaporating the refrigerant in the evaporator 5

(heat exchanger) to achieve a low pressure refrigerant gas, which can be fed to the compressor 2 to continue the process.

Figure 2:
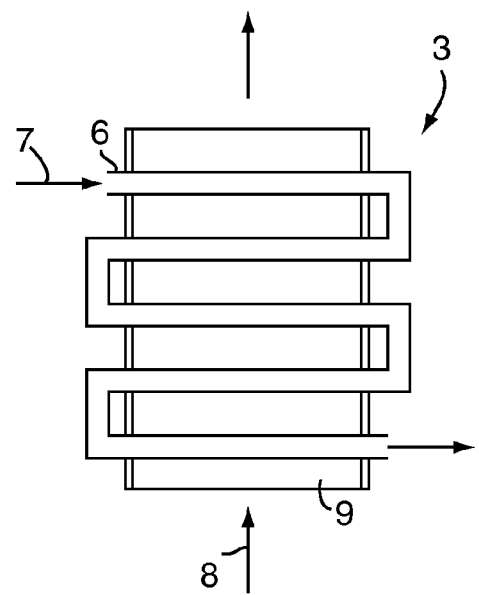
FIG. 2 is a schematic sectional view of a heat exchanger.

A specific example for the heat exchanger is a condenser 3 of a refrigeration system for a frozen food storage cabinet or a refrigerated display cabinet for shops. In FIG. 2 can be seen a schematic sectional view of a cross-flow heat exchanger with a first fluid flow 7 in a conduit 6 and a second fluid flow 8 in a flow path 9. Given the example of a condenser 3 of a refrigeration system 1 as mentioned above, the first fluid is a refrigerant and the second fluid would normally be air. The refrigerant enters the condenser 3 as a superheated gas, which during the passage of the condenser 3 is cooled by the air flowing around and past the hot conduits 6 containing the refrigerant, so the refrigerant gas is cooled to condensation temperature, condensates and leaves the condenser 3 as sub cooled liquid. To obtain and maintain a flow of air through the condenser 3, the condenser 3 is normally provided with a fan (not shown), which can be running constantly, in an on-off mode or with a varying speed.

Typically a condenser 3 of such a system is placed outside the shop, often on the roof, because if it is placed inside, it would lead to temperature increase in the shop, and normally the outside temperature is lower than the inside temperature. However placing the condenser 3 outside has the drawback the condenser 3 may be exposed to clogging up or fouling because of dirt, grease, leaves, newspapers, etc restricting the air flow 8 or reducing heat transfer from the refrigerant to the air, and further the heat exchanger is difficult to reach and to inspect. The intervals of clogging up may be very irregular due to weather conditions, e.g. precipitation, wind direction etc., pollution, seasonal changes, such as leaf fall, which makes it difficult to provide proper inspection intervals.

Figure 3:
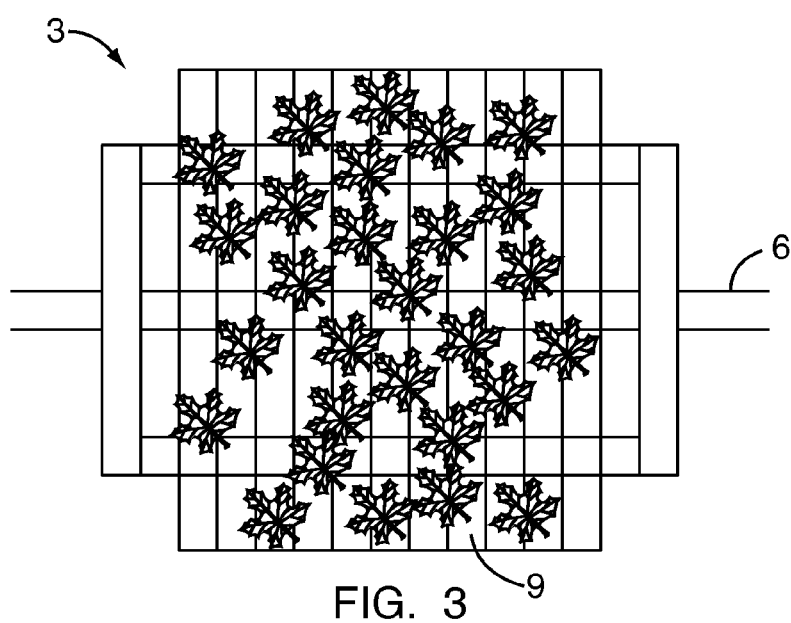
FIG. 3 is a schematic end view of the heat exchanger.

FIG. 3 is a schematic end view of a heat exchanger, which in the given example is the condenser 3, the inlet of which is partly covered by leaves. This means that the air flow through the flow path 9 of the condenser 3 is restricted, and hence that heat exchange is reduced. To be able to detect such an abnormality, an air outlet temperature estimator is proposed using an air flow dependent thermo conductivity $\alpha$. The value of the thermo conductivity is dependent on the given heat exchanger and can be established at start up of the heat exchanger. It is found that the value of this parameter is not critical, and the value may be established based on empirical values or values supplied by the manufacturer of the heat exchanger. The thermo conductivity is flow dependent, and for a heat exchanger comprising a fan forcing air through the heat exchanger, the thermo conductivity $\alpha$ can be expressed as $$\alpha = \alpha_0 \omega^{0.8}, \quad (1)$$

where $\omega$ is the speed of the fan, and $\alpha_0$ is the thermo conductivity at no-flow condition.

An estimate for the air temperature through the condenser 3 can be defined using the thermo conductivity $\alpha$, which for a constant airflow gives $$dt_{air}(y) = \alpha(t_{cond,surf}(y) - t_{air}(y))dy \quad (2)$$

where y denotes the distance from the air inlet, and y is represented as a normalized parameter, i.e. is the distance relative to the total length of the flow path, so the outlet is at 1, $t_{cond,surf}(y)$ is the surface temperature of the condenser heat exchanging surface at position y, and $t_{air}(y)$ is the air temperature at position y. $t_{cond,surf}$ could be established by direct measurement using a temperature sensor. Such sensors, however, are expensive and especially when placed outside they are subject to errors. It is hence preferred to establish an estimate of the surface temperature of the condenser based on evaluation of parameters of the refrigerant.

In the condenser the refrigerant is present in three different phases: in a region at the refrigerant inlet, the refrigerant is in gas phase and more or less superheated, in another region, in which the refrigerant condensates at a constant temperature, the refrigerant is present as a mixture of gas and liquid, and in a third region, the refrigerant is liquid and more or less sub-cooled.

In the following, $t_{cond,surf}(y)$ is in the two-phase and liquid regions assumed to be equal to the condensation temperature of the refrigerant. For the gas phase region $t_{cond,surf}(y)$ is assumed to be the mean of the refrigerant gas temperature and the condensation temperature.

For the region of the heat exchanger, where the refrigerant is present as sub-cooled liquid, which is the region from y=0 to y=$y_1$, it is assumed that the temperature increases linearly with a gradient $k_1$, which is found to produce an adequately accurate temperature profile for most purposes. Estimating as mentioned that the condenser surface temperature equals the condensation temperature, the temperature increment can be found as:

$$dt_{air}(y) = \alpha(t_{liquid} + k_1 y - t_{air}(y))dy \quad (3)$$

where $k_1$ is a constant describing the temperature gradient in the sub-cooled region, and $t_{liquid}$ is the refrigerant temperature at the refrigerant outlet.

For the second, two-phase region from y=$y_1$ to y=$y_2$, estimating as mentioned that the condenser surface temperature equals the condensation temperature ($t_{cond,surf} = t_{cond}$), $$dt_{air}(y) = \alpha(t_{cond} - t_{air}(y))dy \quad (4)$$

For the superheated gas region, i.e. the region from y=$y_2$ to y=$y_3$=1, the temperature is assumed to vary linearly with a gradient $k_2$, and the equation is estimated as $$dt_{air}(y) = \alpha(t_{cond} + k_2(y - y_2) - t_{air}(y))dy \quad (5)$$

where $y_2$ denotes the end of the two-phase region, and $k_2$ denotes a mean temperature gradient for the superheated gas phase.

To obtain the air temperature in the condenser, the above equations (3), (4) and (5) are integrated, and hence:

For the sub-cooled region ($0 \leq y \leq y_1$)

$$t_{air}(y_1) = t_{liquid} + k_1 y_1 - \frac{k_1}{\alpha} + \frac{(\alpha t_{air}(0) + k_1 - \alpha t_{liquid})}{\alpha} e^{\alpha y_1} \quad (6)$$

where $t_{air}(0)$ is the air temperature at the inlet to the flow path 9, i.e. the ambient temperature.

For the two-phase region ($y_1 \leq y \leq y_2$)

$$t_{air}(y_2) = t_{cond} + (t_{air}(y_1) - t_{cond})e^{-\alpha(y_2 - y_1)} \quad (7)$$

For the superheated gas region (y2<y<1(=y3))

$$t_{air}(y_3) = t_{cond} + k_2(y_3 - y_2) - \frac{k_2}{\alpha} + \frac{(\alpha t_{air}(y_2) + k_2 - \alpha t_{cond})}{\alpha} e^{-\alpha(y_3 - y_2)} \quad (8)$$

Figure 4:
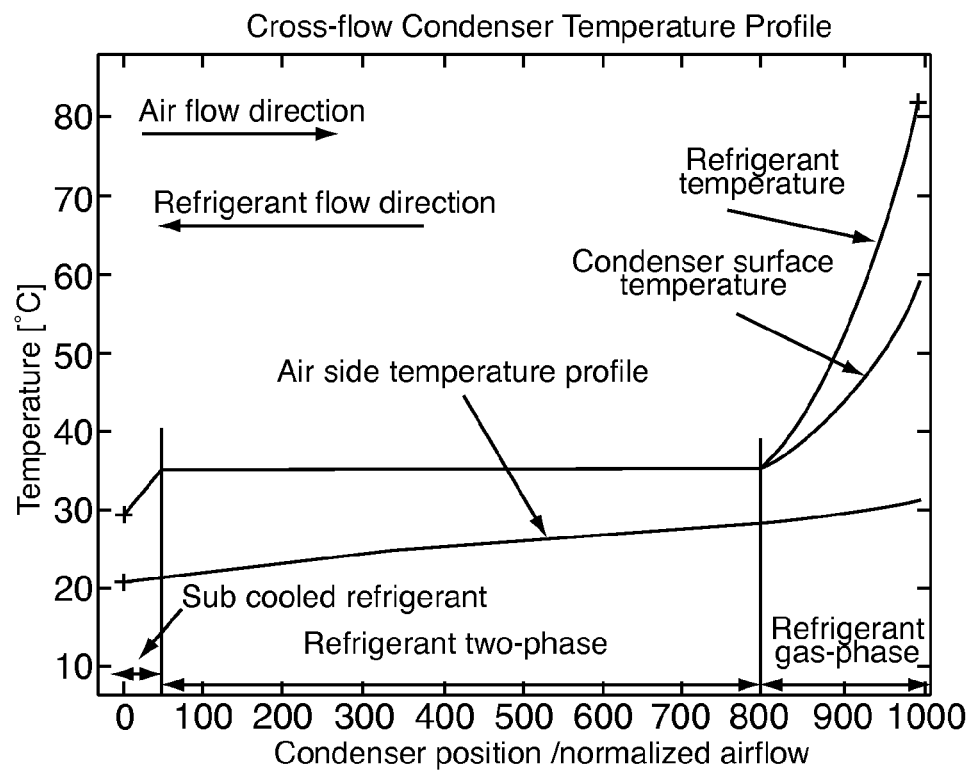
FIG. 4 is an example of a temperature profile in the heat exchanger.

It is hence possible to estimate an air outlet temperature using these equations. Parameters needed for the air outlet temperature estimate are the air inlet temperature, the temperature of the refrigerant at the inlet and outlet, the condensation temperature of the refrigerant, estimates for $y_1$ and $y_2$, $k_1$ and $k_2$. It is found that for many condensers approximately 5% of the heat exchange is in the first region where the refrigerant is present as sub-cooled liquid, approximately 75% of the heat exchange takes place in the second region, i.e. the part of the condenser where the refrigerant is changing phase from gas to liquid, and the remaining approximately 20% of the heat exchange takes place in the region of the condenser, where the refrigerant is present as superheated gas. The value of $k_1$ can be established more or less empirically based on $y_1$, $t_{liquid}$ and $t_{cond}$, whereas $k_2$ can be established more or less empirically based on $y_2$, the refrigerant outlet temperature, $t_{cond}$ and the overall length of the flow path. The air outlet temperature can thus be obtained primarily based on parameters of the refrigerant, and these refrigerant parameters will normally already be known, as most modern refrigeration systems comprise a controller of the refrigeration system with sensors constantly measuring these parameters. FIG. 4 illustrates an example of the temperature profile of the cross-flow condenser. If a less accurate answer is satisfactory, it is possible to use a simplified model taking e.g. only the two-phase region and the superheated gas region into account, or even only the two-phase region, where most of the heat exchange takes place.

The estimated air outlet temperature can then be compared with a measured air outlet temperature obtained by a temperature sensor at the air outlet. When the heat exchanger experiences an abnormality, a significant estimation error occurs, which can be used to trigger an alarm signal.

Although this approach of comparing the air outlet temperature directly with a measured temperature may be convenient and adequate in some systems, a more stable and reliable result can be obtained when basing the evaluation on the assumption of energy balance of the heat exchanger. However, a direct outlet temperature is rarely convenient and moreover temperature sensor measuring air outlet temperature will seldom be present, so there is a need for an alternative approach.

The energy balance of the condenser can be stated as:

$$\dot{Q}_{Air} = \dot{Q}_{Ref} \quad (9)$$

where $\dot{Q}_{Air}$ is the heat taken up by the air per time unit, i.e. the rate of heat flow delivered to the air, and $\dot{Q}_{Ref}$ the heat removed from the refrigerant per time unit, i.e. the rate of heat flow delivered by the refrigerant.

Figure 5:
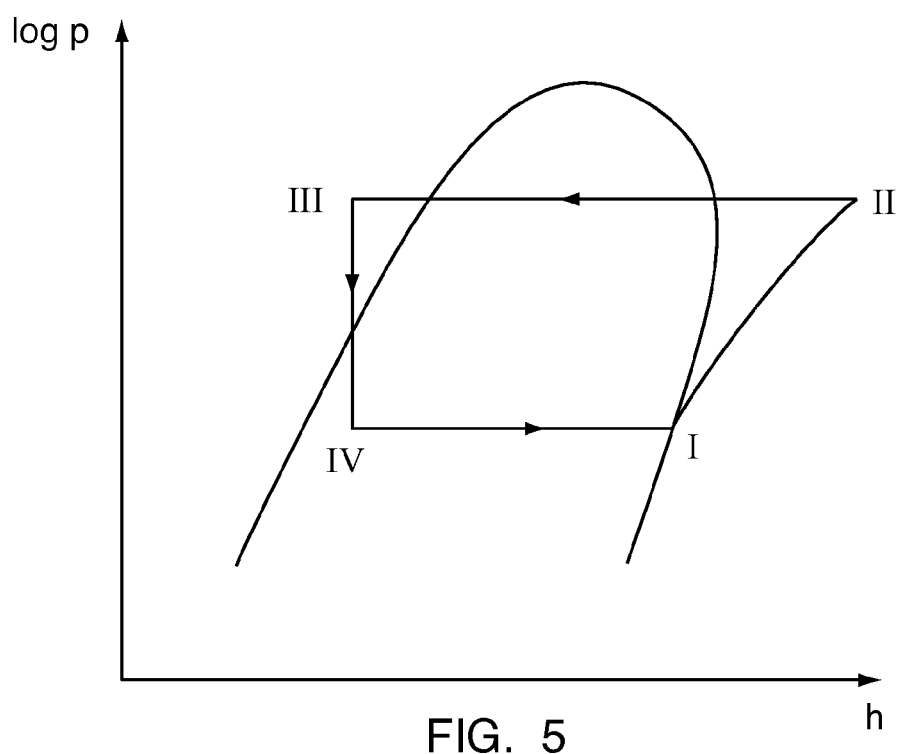
FIG. 5 is a schematic log p,h-diagram of a refrigerant.
Figure 6:
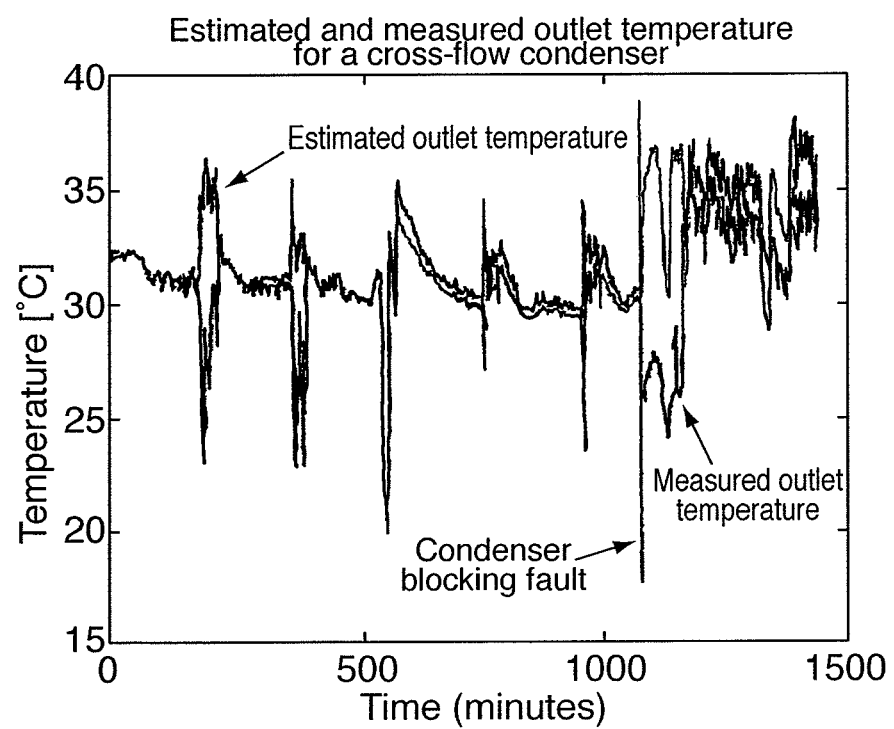
FIG. 6 is a curve of estimated and measured outlet temperature of a condenser.

The basis for establishing the rate of heat flow of the refrigerant ($\dot{Q}_{Ref}$) i.e. the heat delivered by the refrigerant per time unit is the following equation:

$$\dot{Q}_{Ref} = \dot{m}_{Ref}(h_{Ref,in} - h_{Ref,out}) \quad (10)$$

where $\dot{m}_{Ref}$ is the refrigerant mass flow. $h_{Ref,out}$ is the specific enthalpy of the refrigerant at the condenser outlet, and $h_{Ref,in}$ is the specific enthalpy of the refrigerant at the condenser inlet. The specific enthalpy of a refrigerant is a material and state property of the refrigerant, and the specific enthalpy can be determined. The refrigerant manufacturer provides a log p, h-diagram of the type according to FIG. 5 for the refrigerant, wherein the thermodynamic cycle of a refrigeration system is sketched for illustration. From I to II, the refrigerant gas is compressed in a compressor, from II to III, the refrigerant is cooled in a condenser from a state of superheated gas to condensation and further to a state of sub-cooled liquid. From III to IV, the refrigerant is expanded in an expansion device to a lower pressure, where the refrigerant is present as a mixture of liquid and gas. From IV to I, the refrigerant is heated in an evaporator so at point I at the entry to the compressor, the refrigerant is completely gaseous.

With the aid of this diagram the specific enthalpy difference across the condenser can be established. For example to establish $h_{Ref,in}$ with the aid of a log p, h-diagram, it is only necessary to know the temperature and the pressure of the refrigerant at the condenser inlet ($T_{Ref,in}$ and $P_{Cond}$, respectively). Those parameters may be measured with the aid of a temperature sensor and a pressure sensor.

Similarly, to establish the specific enthalpy at the condenser outlet, two measurement values are needed: the refrigerant temperature at condenser outlet ($T_{Ref,out}$) and the pressure at the condenser outlet ($P_{Cond}$), which can be measured with a temperature sensor and a pressure sensor, respectively.

Instead of the log p, h-diagram, it is naturally also possible to use values from a chart or table, which simplifies calculation with the aid of a processor. Frequently the refrigerant manufacturers also provide equations of state for the refrigerant, so a direct calculation can be made.

The mass flow of the refrigerant may be established by assuming solely liquid phase refrigerant at the expansion device entry. In refrigeration systems having an electronically controlled expansion valve, e.g. using pulse width modulation, it is possible to determine the theoretical refrigerant mass flow based on the opening passage and/or the opening period of the valve, when the difference of absolute pressure across the valve and the subcooling ($T_{V,in}$) at the expansion valve entry is known. Similarly the refrigerant mass flow can be established in refrigeration systems using an expansion device having a well-known opening passage e.g. fixed orifice or a capillary tube. In most systems the above-mentioned parameters are already known, as pressure sensors are present, which measure the pressure in the condenser 3. In many cases the subcooling is approximately constant, small and possible to estimate, and therefore does not need to be measured. The refrigerant mass flow through the expansion valve can then be calculated by means of a valve characteristic, the pressure differential, the subcooling and the valve opening passage and/or valve opening period. With many pulse width modulated expansion valves it is found for constant subcooling that the theoretical refrigerant mass flow is approximately proportional to the difference between the absolute pressures before and after and the opening period of the valve. In this case the theoretical mass flow can be calculated according to the following equation:

$$\dot{m}_{Ref} = k_{exp} \cdot (P_{cond} - P_{Evap}) \cdot OP \quad (11)$$

where $P_{Cond}$ is the absolute pressure in the condenser, $P_{Evap}$ the pressure in the evaporator, OP the opening period and $k_{Exp}$ a proportionality constant, which depend on the valve and subcooling. In some cases the subcooling of the refrigerant is so large, that it is necessary to measure the subcooling, as the refrigerant flow through the expansion valve is influenced by the subcooling. In a lot of cases it is however only necessary to establish the absolute pressure before and after the valve and the opening passage and/or opening period of the valve, as the subcooling is a small and fairly constant value, and subcooling can then be taken into consideration in a valve characteristic or a proportionality constant. The value of the mass flow is not critical, and another possibility is to establish the mass flow from the compressor directly based on empirical values e.g. data supplied by the manufacturer of the compressor and the absolute pressure before and after the compressor.

Similarly the rate of heat flow heat of the air ($\dot{Q}_{Air}$), i.e. the heat taken up by the air per time unit may be established according to the equation:

$$\dot{Q}_{Air} = \dot{m}_{Air}(h_{Air,out} - h_{Air,in}) \quad (12)$$

where $\dot{m}_{Air}$ is the mass flow of air per time unit, $h_{Air,in}$ is the specific enthalpy of the air before the condenser, and $h_{Air,out}$ is the specific enthalpy of the air after the condenser.

The specific enthalpy of the air can be calculated based on the following equation:

$$h_{Air}=1.006 \cdot t+x(2501+1.8 \cdot t), [h]=\text{kJ/kg} \tag{13}$$

where t is the temperature of the air, i.e. $T_{air,in}$ before the condenser and $T_{air,out}$ after the condenser. x denotes the absolute humidity of the air. The absolute humidity of the air can be calculated by the following equation:

$$x = 0.62198 \cdot \frac{p_W}{p_{Amb} - p_W} \tag{14}$$

Here $p_W$ is the partial pressure of the water vapour in the air, and $p_{Amb}$ is the air pressure. $p_{Amb}$ can either be measured or a standard atmosphere pressure can simply be used. The deviation of the real pressure from the standard atmosphere pressure is not of significant importance in the calculation of the amount of heat per time unit delivered by the air. The partial pressure of the water vapour is determined by means of the relative humidity of the air and the saturated water vapour pressure and can be calculated by means of the following equation:

$$p_W = p_{W,Sat} \cdot RH \tag{15}$$

Here RH is the relative humidity of the air and $p_{W,Sat}$ the saturated pressure of the water vapour. $p_{W,Sat}$ is solely dependent on the temperature, and can be found in thermodynamic reference books. The relative humidity of the air can be measured or a typical value can be used in the calculation.

When equations (10) and (12) is set to be equal, as implied in equation (9), the following is found:

$$\dot{m}_{Air}(h_{Air,Out}-h_{Air,In})=\dot{m}_{Ref}(h_{Ref,In}-h_{Ref,Out}) \tag{16}$$

From this the air mass flow $\dot{m}_{Air}$ can be found by isolating $\dot{m}_{Air}$:

$$\dot{m}_{Air} = \dot{m}_{Ref} \cdot \frac{(h_{Ref,In} - h_{Ref,Out})}{(h_{Air,Out} - h_{Air,In})} \tag{17}$$

Assuming faultless air flow this equation can be used to evaluate the operation of the system. In many cases it is recommended to register the air mass flow in the system. As an example this air mass flow can be registered as an average over a certain time period, in which the refrigeration system is running under stabile and faultless operating conditions. Such a time period could as an example be 100 minutes. This estimated air mass flow found as an average under stabile and faultless operating conditions is denoted $\bar{m}_{Air}$.

A certain difficulty lies in the fact that the signals from the different sensors (thermometers, pressure sensors) are subject to significant variation. These variations can be in opposite phase, so a signal for the estimated air outlet temperature or the energy balance is achieved, which provides certain difficulties in the analysis. These variations or fluctuations are a result of the dynamic conditions in the refrigeration system. It is therefore advantageous regularly, e.g. once per minute, to establish a value, which in the following will be denoted "residual", based on the energy balance according to equation (9):

$$r=\dot{Q}_{Air}-\dot{Q}_{Ref} \tag{18}$$

so based on the equations (10) and (12), the residual can be found as:

$$r=\bar{m}_{Air}(h_{Air,Out}-h_{Air,In})-\dot{m}_{Ref}(h_{Ref,In}-h_{Ref,Out}) \tag{19}$$

where $\bar{m}_{Air}$ is the estimated air mass flow, which is established as mentioned above, i.e. as an average during a period of faultless operation. Another possibility is to assume that $\bar{m}_{Air}$ is a constant value, which could be established in the very simple example of a condenser having a constantly running fan. Even in systems with variable flow capacity, such as systems having a plurality of fans, which can be activated independently, or in systems incorporating one or more fans running with variable speed, e.g. using a frequency converter, a fair estimate of the mass flow can be established. The estimated mass flow can be found by establishing the number of currently connected fans, i.e. how many fans are connected, and/or the speed of the fans, to thereby establish the flow capacity of the connected fans, e.g. by use of empirical values.

The estimated air outlet temperature can similarly by evaluated by providing the residual as the difference between the estimated air outlet temperature and a predetermined air outlet temperature. The predetermined air outlet temperature may be measured directly or may be obtained as an empirical value.

In a refrigeration system operating faultlessly, the residual r has an average value of zero, although it is subject to considerable variations. To be able to early detect a fault, which shows as a trend in the residual, it is presumed that the registered value for the residual r is subject to a Gaussian distribution about an average value and independent whether the refrigeration system is working faultless or a fault has arisen.

In principle the residual should be zero no matter whether a fault is present in the system or not, as the principle of conservation of energy or energy balance of course is eternal. When it is not the case in the above equations, it is because the prerequisite for the use of the equations used is not fulfilled in the event of a fault in the system.

In the event of fouling of the condenser surface, the thermo conductivity changes, so that $\alpha$ becomes several times smaller. This is not taken into account in the calculation, so the estimated rate of heat flow of the air $\dot{Q}_{Air}$ used in the equations is significantly bigger than in reality. For the rate of heat flow of the refrigerant ($\dot{Q}_{REF}$), the calculation is correct (or assumed correct), which means that the calculated value for the rate of heat flow of the refrigerant ($\dot{Q}_{REF}$) across the heat exchanger equals the rate of heat flow of the refrigerant in reality. The consequence is that the average of the residual becomes positive in the event of fouling of the condenser surface.

In the event of a fault causing reduced air flow through the condenser (a defect fan or e.g. dirt covering the air inlet of the heat exchanger) the mass flow of air is less than the estimated value of the mass flow of air $\bar{m}_{Air}$ used in the calculations. This means that the rate of heat flow of the air used in the calculations is larger than the actual rate of heat flow of the air in reality, i.e. less heat per unit time is removed by the air than expected. The consequence (assuming correct rate of heat flow of the refrigerant), is that the residual becomes positive in the event of a fault causing reduced air flow across the condenser.

To filter the residual signal for any fluctuations and oscillations statistical operations are performed by investigating the residual.

The investigation is performed by calculating an abnormality indicator according to the following equation:

$$S_{\mu,i} = \begin{cases} S_{\mu,i-1} + s_i, & \text{when } S_{\mu,i-1} + s_{\mu,i} > 0 \\ 0, & \text{when } S_{\mu,i-1} + s_{\mu,i} \leq 0 \end{cases} \tag{20}$$

where $s_{\mu,i}$ is calculated according to the following equation:

$$s_{\mu,i} = c_1\left(r_i - \frac{\mu_0 + \mu}{2}\right) \quad (21)$$

where $c_1$ is a proportionality constant, $\mu_0$ a first sensibility value, $\mu$ a second sensibility value, which is positive.

In equation (20) it is naturally presupposed that the abnormality indicator $S_{\mu,i}$, i.e. at the first point in time, is set to zero. For a later point in time is used $s_{\mu,i}$ according to equation (21), and the sum of this value and the abnormality indicator $S_{\mu,i}$ at a previous point in time is computed. When this sum is larger than zero, the abnormality indicator is set to this new value. When this sum equals or is less than zero, the abnormality indicator is set to zero. In the simplest case $\mu_0$ is set to zero. $\mu$ is a chosen value, which e.g. establish that a fault has arisen. The parameter $\mu$ is a criterion for how often it is accepted to have a false alarm regarding heat exchanger abnormality detection.

When for example a fault occurs in that the air inlet of the condenser is covered by e.g. leaves, then the abnormality indicator will grow, as the periodically registered values of the $s_{\mu,i}$ in average is larger than zero. When the abnormality indicator reaches a predetermined value an alarm is activated, the alarm showing that the air mass flow is reduced. If a larger value of $\mu$ is chosen, fewer false alarms are experienced, but there exist a risk of reducing sensitivity for detection of a fault.

Figure 7:
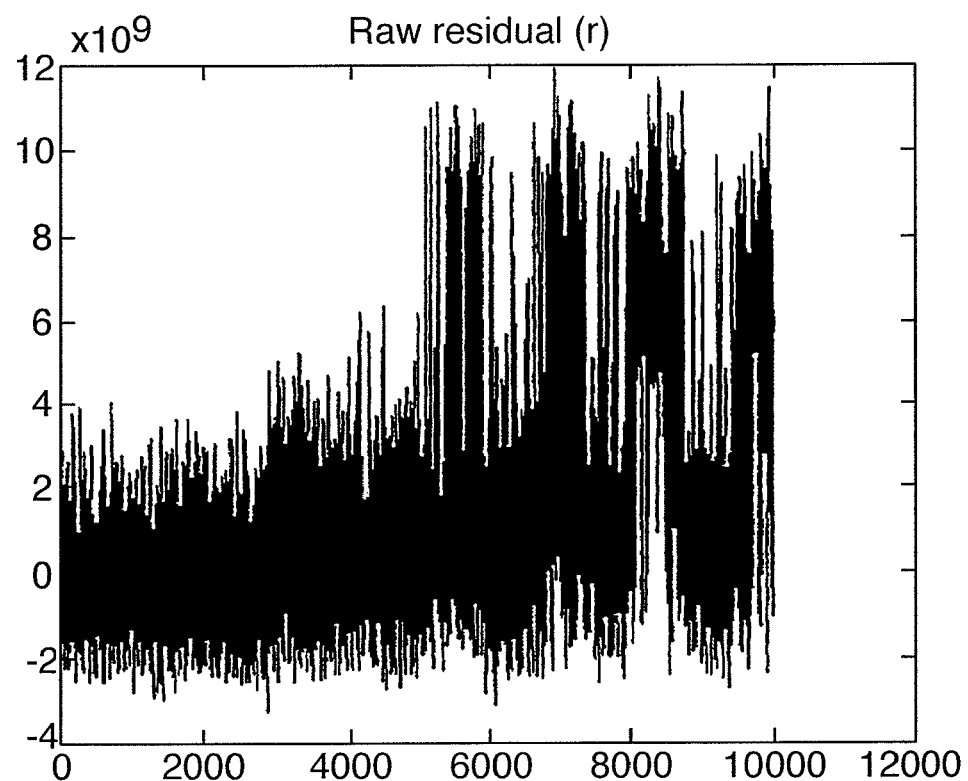
FIG. 7 is a curve of a residual.
Figure 8:
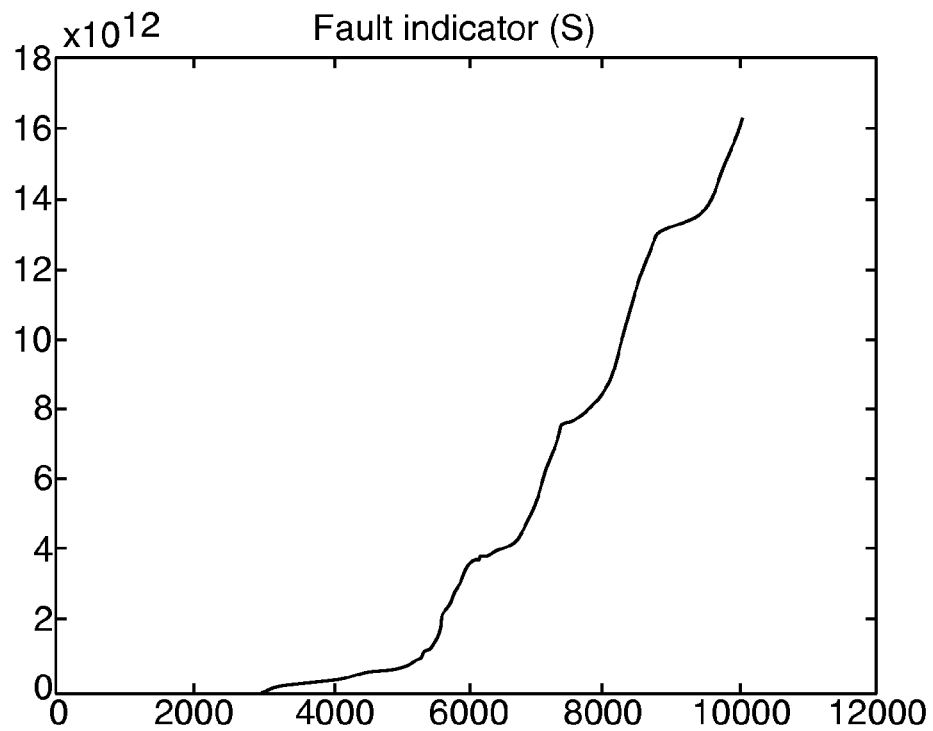
FIG. 8 is a curve of an abnormality indicator.

The principle of operation of the filtering according to equation (20) and (21) shall be illustrated by means of FIGS. 7 and 8, where the filtering is used on the residual found using energy balance, i.e. based on equation (18). In FIG. 7 the time in minutes is on the x-axis and on the y-axis the residual r. FIG. 7 illustrates the emerging of a fault in that the condenser of a shop was subject to a sudden fouling at approximately t=2900 minutes. However, as can be seen the signal is subject to quite significant fluctuations and variations, which makes evaluation difficult, and the presence of a problem is really not evident before approximately t=5500 minutes.

Figure 9:
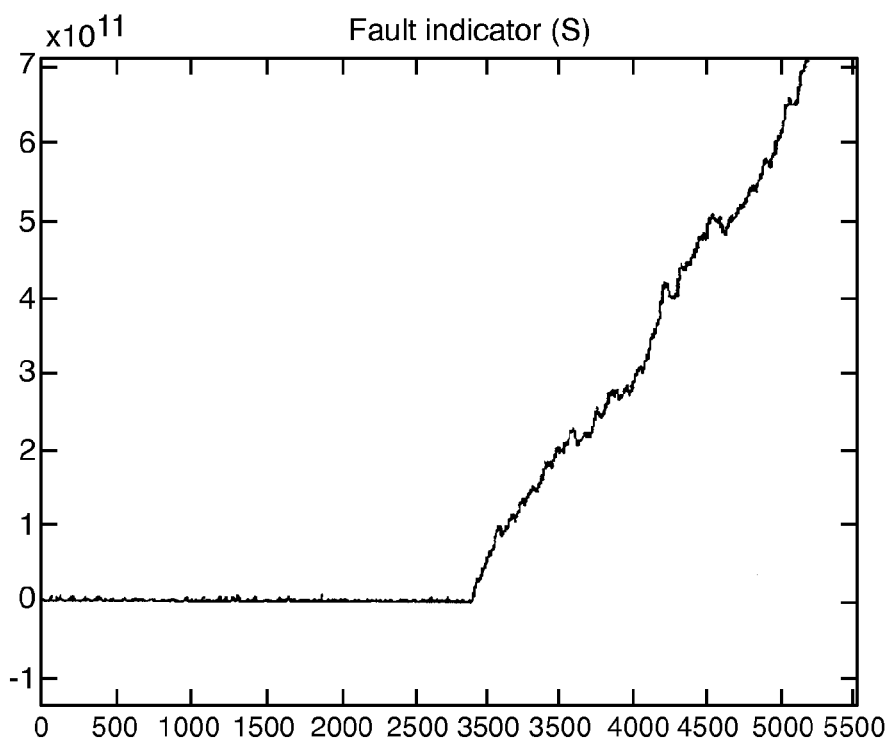
FIG. 9 is an enlarged portion of the curve according to FIG. 8.

In FIG. 8, which represent the filtering of the data of FIG. 7 with means of the abnormality indicator according to equation (20), the time in minutes in on the x-axis and on the y-axis the abnormality indicator S. As can be seen, the heat exchanger was working properly until approximately t=2900 minutes, when a sudden fouling took place, and the abnormality indicator S rose. This is easier to see in FIG. 9, which is an enlarged portion of FIG. 8. In FIG. 9 the abnormality at approximately t=2900 minutes can be easily detected using the abnormality indicator S compared to using the residual or the air outlet temperature.

A further advantage of the device is that it may be retrofitted to any refrigeration or heat pump system without any major intervention in the refrigeration system. The device uses signals from sensors, which are normally already present in the refrigeration system, or sensors, which can be retrofitted at a very low price.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method for detecting an abnormality of a heat exchanger exchanging heat between a first fluid flow of a refrigerant flowing in a conduit and a second fluid flow flowing along a flow path, said conduit and said flow path each having an inlet and an outlet, said method comprising the steps of:
    establishing at least one parameter representative of the temperature conditions of the heat exchanger;
    establishing a second fluid inlet temperature;
    establishing a parameter indicative of an expected heat exchange between the heat exchanger and the second fluid;
    calculating an estimated second fluid outlet temperature; and
    employing the estimated second fluid outlet temperature for evaluating the heat exchange between the first and second fluids by comparing the estimated second fluid outlet temperature, or a parameter derived therefrom, with a reference value;
    the calculating step further comprising establishing the estimated second fluid outlet temperature from at least one parameter representative of the temperature conditions of the heat exchanger, the second fluid inlet temperature and the parameter indicative of the expected heat exchange;
    establishing a first heat rate of the first fluid using a specific enthalpy change of the first fluid across the heat exchanger, the specific enthalpy change being obtained from the group consisting of a log p, h-diagram of the refrigerant, a p,h-chart of the refrigerant, a p,h-table of the refrigerant, and an equation of state for the refrigerant;
    using the estimated second fluid outlet temperature to establish a second heat rate of the second fluid; and
    evaluating an energy balance of the second heat rate of the second fluid by comparing the second heat rate of the second fluid to the first heat rate of the first fluid.

2. The method according to claim 1, wherein the reference value is a predetermined second fluid outlet temperature.

3. The method according to claim 2, further comprising establishing a residual as a difference between the estimated second fluid outlet temperature and the predetermined second fluid outlet temperature.

4. The method according to claim 1, further comprising establishing the second rate of heat flow of the second fluid by establishing an estimate of a second fluid mass flow and a specific enthalpy change of the second fluid across the heat exchanger based on the estimated second fluid outlet temperature and the second fluid inlet temperature, and the condensation pressure.

5. The method according to claim 1, further comprising establishing the first rate of heat flow by establishing a first fluid mass flow and the specific enthalpy change of the first fluid across the heat exchanger based on parameters representative for first fluid inlet and outlet temperatures.

6. The method according to claim 1, further comprising establishing a residual as a difference between the first heat rate and the second heat rate.

7. The method according to claim 6, further comprising providing an abnormality indicator by means of the residual, the abnormality indicator being provided according to the formula:

$$S_{\mu,i} = \begin{cases} S_{\mu,i-1} + s_i, & \text{when } S_{\mu,i-1} + s_{\mu,i} > 0 \\ 0, & \text{when } S_{\mu,i-1} + s_{\mu,i} \leq 0 \end{cases} \quad (20)$$

where $s_{\mu,i}$ is calculated according to the following equation:

$$s_{\mu,i} = c_1\left(r_i - \frac{\mu_0 + \mu}{2}\right) \quad (21)$$

where $r_i$: residual
$c_1$: proportionality constant
$\mu_0$: first sensibility value
$\mu$: second sensibility value.

* * * * *